(12) United States Patent  (10) Patent No.: US 8,167,240 B2
Greiner  (45) Date of Patent: May 1, 2012

(54) SYSTEM AND METHODS FOR BUOYANCY MANAGEMENT IN AN AIRSHIP

(75) Inventor: Douglas H. Greiner, Stevenson Ranch, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 508 days.

(21) Appl. No.: 12/404,241

(22) Filed: Mar. 13, 2009

(65) Prior Publication Data

US 2010/0230533 A1 Sep. 16, 2010

(51) Int. Cl.
*B64D 1/58* (2006.01)
(52) U.S. Cl. .......................................... 244/97
(58) Field of Classification Search ................ 244/12.4, 244/24–30, 56, 66, 96–99
See application file for complete search history.

(56) References Cited

U.S. PATENT DOCUMENTS

| | | | | |
|---|---|---|---|---|
| 3,869,103 A | * | 3/1975 | Nelson et al. | 244/100 R |
| 4,019,698 A | * | 4/1977 | Earl | 244/110 A |
| 5,909,857 A | * | 6/1999 | Filimonov | 244/29 |
| 6,880,783 B2 | * | 4/2005 | Munk | 244/25 |
| 7,040,572 B2 | * | 5/2006 | Munk | 244/100 R |
| 8,016,229 B2 | * | 9/2011 | Greiner et al. | 244/100 A |
| 2006/0065777 A1 | | 3/2006 | Walden et al. | |

FOREIGN PATENT DOCUMENTS

| | | |
|---|---|---|
| GB | 2 445 744 | 7/2008 |
| GB | 2 447 706 | 9/2008 |
| WO | WO 01/94172 | 12/2001 |

* cited by examiner

*Primary Examiner* — Richard Price, Jr.
(74) *Attorney, Agent, or Firm* — McDermott Will & Emery LLP

(57) ABSTRACT

An airship comprising a hull configured to be inflated with a first gas; a ballonet in the hull, the ballonet configured to be inflated with a second gas that is heavier than the first gas; a fan configured to draw the second gas into the ballonet; an inflatable landing system; a duct configured in the ballonet to allow access to components in the airship; and a valve coupled to the ballonet. The valve provides a pathway for air to flow between the ballonet and a plenum chamber, the plenum chamber is formed by the airship, a landing surface, and the inflatable landing system when the inflatable landing system is in contact with the landing surface.

25 Claims, 3 Drawing Sheets

Cross section A-A

SYSTEM AND METHODS FOR BUOYANCY MANAGEMENT IN AN AIRSHIP

BACKGROUND

A hybrid airship can combine the characteristics of different aviation technologies such as heavier-than-air (HTA) aircraft, lighter-than-air (LTA) vehicles, fixed wing aircraft, helicopter, hovercraft, and others, to perform desired functions. Hybrid airships are currently being developed that combine the advantages of an aerodynamic shape with the cargo capacity, simplicity, and low operating costs of airships. Uses for such vehicles include cargo transport, telecommunications platforms, surveillance, emergency response, advertising platforms, and tourism, among others.

LTA vehicles are typically slow and difficult to maneuver. Yet, it is desirable to develop a hybrid airship capable of take off and landing in a minimum amount of space. Traditional LTA vehicles with an air cushioned landing system (ACLS) have been proposed to reduce the take off and landing space requirement. However, many traditional ACLS systems have fixed configurations during take off and landing and also during the flight. This increases drag and reduces fuel efficiency. More recently, some LTA vehicles include an ACLS system that is operable in dual modes including a take off and landing mode that is suitable for landing and take off, and a flight mode that is suitable for operation during the flight of the vehicle. However, traditional tools and techniques that are used for enabling the dual mode ACLS system to transition between the flight mode and the take off and landing mode are often impractical, inefficient, and prone to frequent failures.

SUMMARY

In some embodiments, an airship comprising a hull configured to be inflated with a first gas; a ballonet in the hull, the ballonet configured to be inflated with a second gas that is heavier than the first gas; a fan configured to draw the second gas into the ballonet; an inflatable landing system; a duct configured in the ballonet to allow access to components in the airship; and a valve coupled to the ballonet. The valve provides a pathway for air to flow between the ballonet and a plenum chamber, the plenum chamber is formed by the airship, a landing surface, and the inflatable landing system when the inflatable landing system is in contact with the landing surface.

BRIEF DESCRIPTION OF THE FIGURES

Embodiments of the present invention can be better understood, and their numerous objects, features, and advantages made apparent to those skilled in the art by referencing the accompanying drawings. The use of the same reference symbols in different drawings indicates similar or identical items.

DETAILED DESCRIPTION

Figure 1:
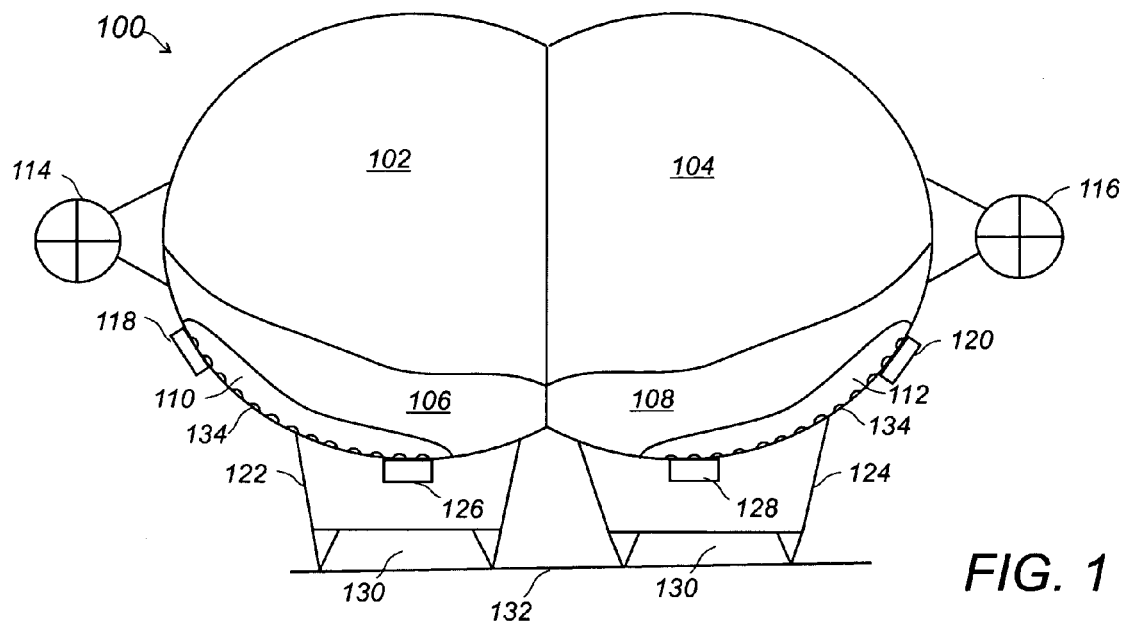
FIG. 1 is a front view of an embodiment of an airship in accordance with the present invention.

FIG. 1 is a front view of an embodiment of airship 100 including first and second hulls 102, 104, ballonets 106, 108, ducts 110, 112, propulsion systems 114, 116, fans 118, 120, air cushion landing systems (ACLS) 122, 124, and valves 126, 128. Hulls 102, 104 provide the main structure of the airship 100 and are typically filled with lighter-than-air gas such as helium. Ballonets 106, 108 and ducts 110, 112 can be positioned within hulls 102, 104 and are typically filled with air. Propulsion systems 114, 116 can include a propellor-driven engines mounted external to the sides of hulls 102, 104 although other suitable propulsion systems can be used. Propulsion systems 114, 116 can be gimballed to help steer airship 100 in up to three dimensions. Although airship 100 is shown with 2 hulls 102, 104, airship 100 may be configured with one or more hulls 102, 104, ballonets 106, 108, ducts 110, 112, propulsion systems 114, 116, fans 118, 120, air cushion landing systems (ACLS) 122, 124, and valves 126, 128.

An airship 100 equipped with ACLS 122, 124 offers considerable lifting capacity, operational flexibility, and cost effectiveness as well as the ability to operate from unimproved landing sites on both land and water. ACLS 122, 124 can be configured in accordance with a flight mode of the airship 100, for example, ACLS 122, 124 is typically fully inflated during landing, touchdown, and take-off, but deflated into a stowed position to reduce drag during up and away flight. An air cushion pad of the ACLS 122, 124 can be formed around an open center to create plenum chambers 130 when ACLS 122, 124 touches the ground. Valves 126, 128 can operate to form suction within the plenum chambers 130 to stabilize and retain airship 100 on the ground.

Ducts 110, 112 can be large enough to allow maintenance personnel to access various components such as propulsion systems 114, 116, fans 118, 120, and valves 126, 128. Ducts 110, 112 may also provide a route for electric cables, hydraulic lines, and other components internal to airship 100 with sufficient space to separate components such as electric cables and hydraulic or fuel lines from one another as required. Fans 118, 120 can supply air to ballonets 106, 108 and ACLS 122, 124. Valves 126, 128 can control airflow from fans 118, 120 to ACLS 122, 124. When ACLS 122, 124 are inflated, plenum chambers 130 are formed by the ACLS 122, 124 and landing surface 132. In some embodiments, fans 118, 120 are induction fans that draw air into ballonets 106, 108 through air vents 134 in the outer surface of airship 100.

Airship 100 can be equipped with an on-board source of lighter-than-air gas (not shown), such as compressed helium tanks or other suitable gas that are configured to supply hulls 102, 104. An onboard processing system, such as a computerized controller as further described in FIG. 7, can also be included in airship 100 and configured to monitor data from subsystems in airship 100 and issue appropriate commands to adjust subsystem operation to achieve desired operational status.

Figure 2:
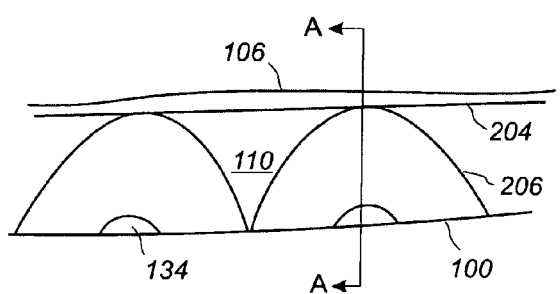
FIG. 2 is a cross-sectional view of an embodiment of a portion of the duct shown in FIG. 1.

FIG. 2 depicts a side view of an embodiment of a portion of duct 110 including spine baton 204 and rib batons 206. Batons 204, 206 provide structural support for duct 110 when ballonet 108 is deflated, at which point, ballonet 108 is draped over batons 204, 206. Rib baton 206 typically extends along the length of duct 110 at a distance from the inner surface of airship 100 that is sufficient to allow a person and equipment to traverse the length of duct 110. The length and position of duct 110 can be selected to allow access to various components of airship 100, such as fans 118, 120, propulsion systems 114, 116, ACLS 122, 124, and valves 126, 128 for maintenance and other purposes.

Figure 3:
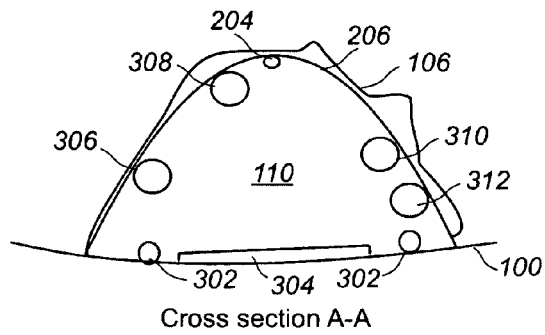
FIG. 3 is a cross-sectional view of an embodiment of the portion of the duct shown in FIG. 2.

FIG. 3 depicts an end view cross-section of a portion of duct 110 including components that can be routed through duct 110 such as static line(s) 302, ladder 304, electrical cables 306, hydraulic lines 308, duct lighting 310, and air monitoring equipment 312. Static line 302 and ladder 304 may facilitate access by maintenance personnel through the duct. Electrical and hydraulic cables 306 are routed within duct 110 according to specifications for separating various types of cables from one another.

Figure 4:
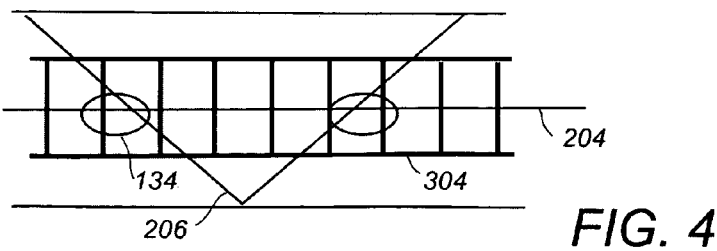
FIG. 4 is a top view of an embodiment of the portion of the duct shown in FIG. 2.

FIG. 4 shows a top view of a portion of duct 110 including ladder 304, air vents 134, spine baton 204, and rib batons 206. Ladder 304 can extend either fully or only partially through duct, and is especially useful to access components such as fans 118, 120 that may be positioned in sloped portions of airship 100. Rib batons 206 can extend from side to side of duct and provide support for rib baton 204 as well as deflated material from ballonet 108. Other suitable structure for forming duct 110 can be used, however.

Figure 5:
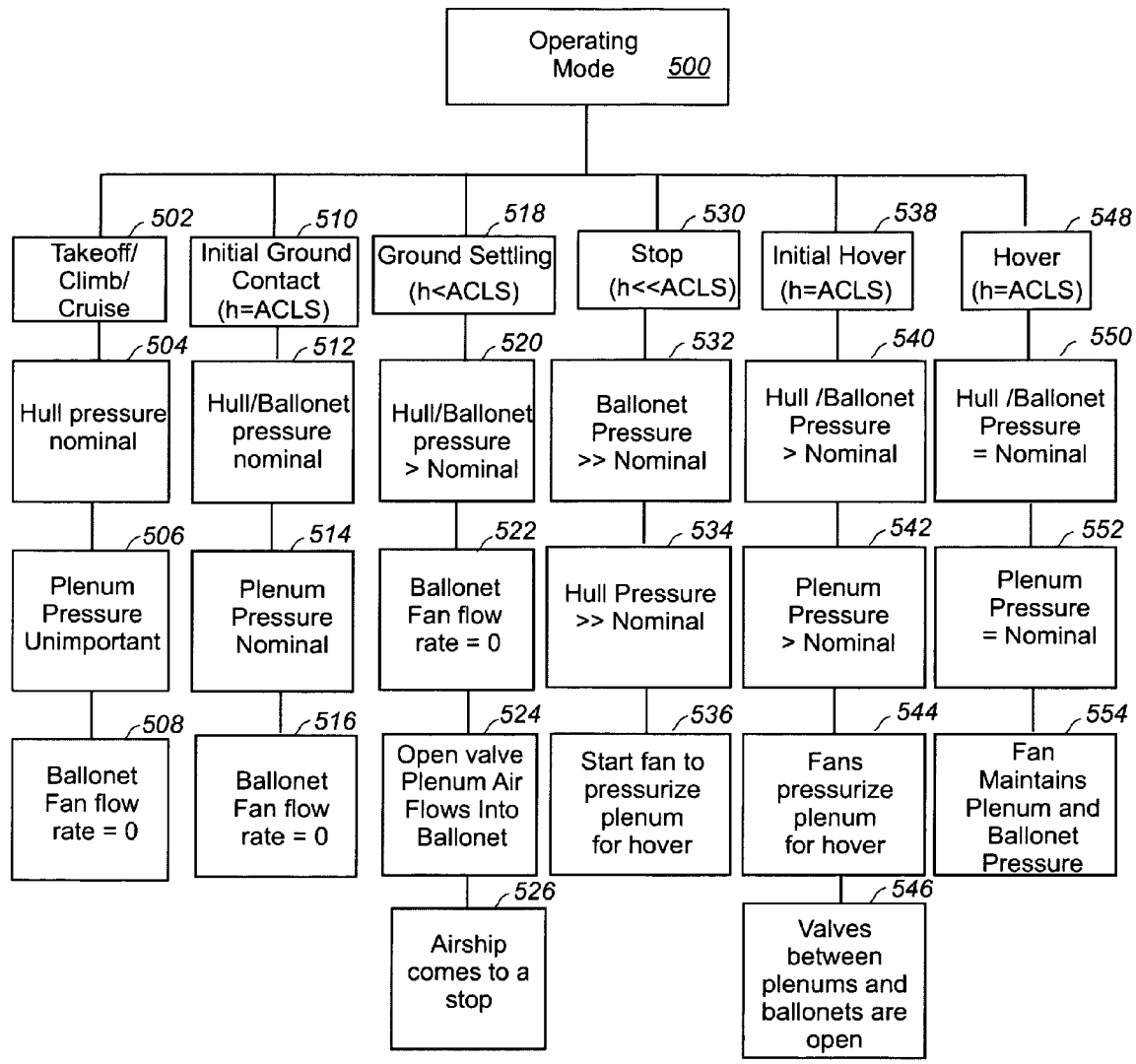
FIG. 5 is a flow chart of an embodiment of operating modes of the airship of FIG. 1.

Referring to FIGS. 1 and 5, FIG. 5 is a chart 500 of an embodiment of operating modes of airship 100 including takeoff/climb/cruise modes 502, initial ground contact mode 510, ground settling mode 518, stop mode 530, initial hover mode 538, and hover mode 548. Note that fans 118, 120 are not always needed to pressurize the plenum chambers 130 since excess pressure inside the hulls 102, 104 may be used to momentarily pressurize the plenum chambers 130. In this way the hulls 102, 104 and ballonets 106, 108 act as an accumulator to assist the fans 118, 120 when needed. This reduces the installed fan power required, thus leading to a more efficient vehicle configuration.

In takeoff, climb and/or cruise mode 502, the pressure of hull 102 is nominal (504), plenum pressure is unimportant (506), and the flow rate of fans 118, 120 is typically zero (508).

During initial ground contact mode (510), the altitude of the bottom of hulls 102, 104 is approximately equal to the height of ACLS 122, 124. The hull/ballonet pressures may be nominal (512), the pressure of plenum chambers 130 is nominal (514), and the flow rate of fans 118, 120 may be zero (516).

During ground settling mode 518, the altitude of the bottom of hulls 102, 104 is less than the height of ACLS 122, 124, and the downward velocity of the airship 100 is less than a predetermined value. The hull/ballonet pressure increases to greater than nominal (520), and the flow rate of fans 118, 120 is zero (522). Valves 126, 128 open so that air flows from plenum chambers 130 to ballonets 106, 10S as the weight of airship 100 compresses ACLS 122, 124 (524) as airship 100 comes to a stop (526).

During stop mode 530, the weight of airship 100 has settled and the altitude of the bottom of hulls 102, 104 is less than the fully-inflated height of the ACLS 122, 124. The pressure of ballonets 106, 10S is much greater than the nominal ballonet pressure as high pressure air from plenum chambers 130 flows into the ballonets 106, 10S (532). The over-inflation of ballonets 106, 10S causes the pressure of hulls 102, 104 to be greater than the nominal pressure (534). Fans 11S, 120 are started to pressurize plenum chambers 130 (536).

Once airship 100 comes to a stop, airship 100 enters initial hover mode 53S. During initial hover mode 53S, the altitude of the bottom of hulls 102, 104 approximately equals the height of ACLS 122, 124 as the excess air pressure from hulls 102, 104 and ballonets 106, 10S is used to inflate plenum chambers 130. Fans 11S, 120 can also operate to pressurize the plenum chambers 130 for hover (544). Valves 126, 12S between the plenum chambers 130 and the ballonets 106, 10S are open (546).

Once the pressure in hulls 102, 104, ballonets 106, 10S, and plenum chambers 130 equalizes in initial hover mode 53S, airship 100 enters hover mode 54S. The altitude of the bottom of hulls 102, 104 approximately equals the height of ACLS 122, 124. The pressures in hulls 102, 104, ballonets 106, 10S, and plenum chambers 130 are nominal (550, 552). Fans 11S, 120 operate to maintain the plenum and ballonet pressure (554).

Referring again to FIG. 1, the outer surface of airship 100 can be fabricated of a non-rigid sheet material, including composite and/or laminated fabric material. Hulls 102, 104 are typically pressurized, thereby eliminating the need for internal structure or bracing. Such a design provides a vehicle 100 with resilient external surfaces that is low cost and low weight. The relatively low height to length profile of hulls 102, 104 provide improved stability and ground handling compared to conventional lighter-than-airships of equal gas volume. The inflated hulls 102, 104 of airship 100 typically carry the primary loads of control surfaces, engines, and other components. Therefore the pressure in the airship 100 generally needs to be maintained even when the vehicle is parked on the ground or stored in a hangar.

Figure 6:
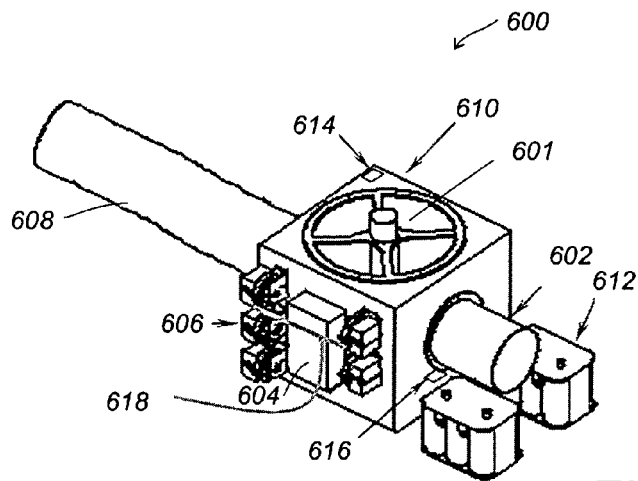
FIG. 6 is a perspective view of an embodiment of a pressure maintenance system for the airship of FIG. 1.

Referring to FIGS. 1 and 6, FIG. 6 shows a perspective view of an embodiment of pressure management system 600 that can be used to maintain the pressure of airship 100 at a desired level while airship 100 is parked on the ground. The embodiment of pressure management system 600 shown includes valve 601, fan/fan duct 602, controller 604, pressure switches 606, outlet duct 608, power supply 610, back up power supply 612, fan override switch 614, circuit breaker switch 616, and vehicle pressure line 618. Pressure management system 600 can adjust and maintain pressure in hull 102, ballonet 106, and plenum chamber 130. Note that while each hull 102, 104 and ballonet 106, 108 can accommodate a pressure management system 600, a single pressure management system 600 can be configured to manage the pressure in two or more hulls 102, 104, ballonets 106, 108, and plenum chambers 130. Pressure management system 600 can be connected to airship 100 by connecting a fan duct 602 to a plug in airship 100. One or more clamps, straps, and/or other suitable device can be used to secure the duct to the airship 100.

Valve 601 can be opened to release air and closed to retain air in airship 100 manually or under automatic operation by controller 604.

A fan 602 provides an air pressure source with pressure sensors 606 that can adjust fan operation to accommodate gas volume expansion and contraction caused by atmospheric conditions (temperature and pressure) and leakage.

Controller 604 controls operation of pressure management system 600 to achieve a desired pressure according to the flight mode, as described with respect to FIG. 5 hereinabove. Controller 604 can communicate with another processing system on board airship 100 to coordinate operation of pressure management system 600 and other subsystems based on flight mode, subsystem status, and other relevant information.

A number of switches 606 can be configured to send control commands to the controller 604 for various functions including a valve switch, high pressure alarm switch, low pressure alarm switch, high pressure switch, and low pressure switch, as shown for example in Table 1 below. Note that the numbers shown are for example only and may be varied depending on a particular vehicle's requirements/configuration.

TABLE 1

Pressure Switch Settings

VALVE SWITCH

Open: 4.0 in $H_2O$
Close: 4.2 in $H_2O$
Wired: normally closed
HIGH PRESSURE SWITCH Open: 3.7 in $H_2O$
Close: 3.5 in $H_2O$
Wired: normally open
LOW PRESSURE SWITCH Open: 2.6 in $H_2O$
Close: 2.4 in $H_2O$
Wired: normally Open
HIGH PRESSURE ALARM SWITCH Open: 4.1 in $H_2O$
Close: 4.3 in $H_2O$
Wired: normally closed
LOW PRESSURE ALARM SWITCH Open: 2.4 in $H_2O$
Close: 2.2 in $H_2O$
Wired: normally open If the vehicle is to be left unattended, low and high pressure alarm switches can be connected to an alarm system that provides alerts when high or low pressure conditions are detected. For example, the alarm system can be configured to make phone calls and play a message indicating the nature of the problem. The alarm system can be equipped with battery backup. Lights can also be connected to and operated by controller 604 to indicate status. For example, one light may indicate that the pressure maintenance system 600 has power. Another light may indicate that the fan has been commanded to run. Visual indicators can be located within view of a video camera or other visual monitoring system for remote monitoring.

Controller 604 can include mode switches (not shown) that set the mode of the controller 604 and status lights (not shown). The mode switches can include, for example, a valve switch, a fan switch, and a fan mode switch, as shown for example in Table 2 below:

TABLE 2

Mode Switches

| | |
|---|---|
| Fan switch | provides on-off-automatic control settings for the fan 602 |
| Valve switch (three position) | provides on-off-automatic control settings for the valve 601 |
| Fan mode switch | selects pressure to control to low pressure, high pressure, or off position |

In normal operation the fan switch and valve switch are typically left in automatic mode. Fan mode switch 624 can be set to low pressure, unless full vehicle pressure is required for maintenance or operational reasons. For example, fan mode switch may be set to HIGH as required to stretch hulls 102, 104 to full flight pressure to tighten lacing. A programmable relay can be used to delay fan shut-off to eliminate excessive cycling of fan 602 thereby preventing chatter and vibration.

Outlet duct 608 can be used to connect pressure maintenance system 600 to a ground pressurization port.

Power supply 610 provides suitable power to the components of pressure management system 600, such as thirty (30) amp, twenty-eight (28) volt direct current. Back up power supply 612 can provide an alternate power source using any suitable power supply, such as one or more batteries.

Fan override switch 614 bypasses the controller 604 to manually operate fan 602.

Circuit breaker switch 616 removes power and/or backup power from controller 604 in the event an overcurrent condition is detected.

Vehicle pressure line 618 can be coupled to a pressure manifold switch and pressure gage to control the pressure in hulls 102, 104 and/or ballonets 106, 108.

Note that when operating on battery power alone, fan 602 may not be able to produce the pressure required to maintain the airship 100 at the desired minimum pressure. Therefore, in the event of a power failure, the fan mode switch can be set to low pressure.

Figure 7:
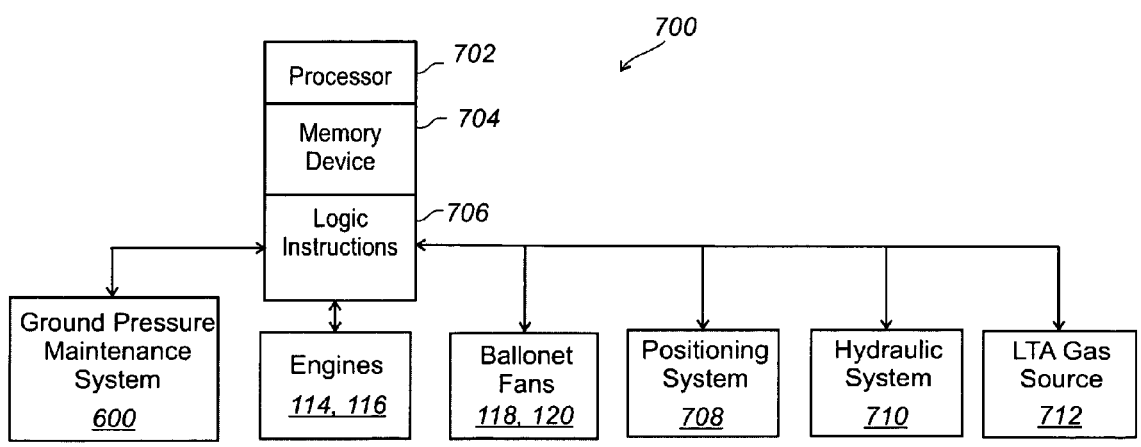
FIG. 7 is a block diagram of an embodiment of a processing system to control a valve, motor, hull pressure and/or ballonet pressure in the airship of FIG. 1.

Referring to FIG. 7, a block diagram of a processing system 700 that can be included in airship 100 (FIG. 1) is shown including processor 702, memory device 704, and logic instructions 706. Processing system 700 can interface with a variety of subsystems and sensors that provide information about the operational state of airship 100 such as pressure maintenance system 600, engines 114, 116, fans 118, 120, satellite positioning system 708, hydraulic system 710, and lighter-than-air (LTA) gas source 712. For example, positioning system 708 can provide the latitude, longitude, and altitude of the airship 100. Other sensor information regarding the electrical systems, engine, throttle position, fuel system, pressure of hulls 102, 104, ballonets 106, 108, ACLS 122, 124, and hydraulic system 710 can be provided for use by logic instructions 706.

Processor 702 can be any suitable computer-processing device that communicates with memory device 704 to access and execute logic instructions, such as logic instructions 706 to receive input from sensors and issue control commands to subsystems to transition to, establish and maintain desired flight modes of airship 100, such as the flight modes shown in FIG. 5 for example. Processor 702 can interface with various input/output devices, such as a keyboard, touchscreen, buttons, knobs, switches, and/or other suitable input/output devices that allow a user to interact with components internal and external to processing system 700.

Logic instructions 706 can be executed by processor 702 and configured to operate airship 100 automatically as well as allow manual inputs from crewmembers. Logic instructions 706 can determine whether the modes requested by the crewmembers are permitted based on the current mode of airship 100, and issue alerts if desired operational modes cannot be achieved. Mode control and option selections can also be transmitted from crewmembers processor 702 to various subsystems to control operational modes of various subsystems. As shown, logic instructions 706 as executed by processor 702 send outputs to open and close valves 126, 128, control propulsion systems 114, 116 and fans 118, 120, and inflate and deflate hulls 102, 104, ballonets 106, 108, and ACLS 122, 124.

Logic instructions 706 executed by processor 702 can be stored in memory device 706, on computer readable medium, or accessed by processor 702 in the form of electronic signals. Processor 702 can be configured to interface with other processors, and to connect to an external network via a suitable communication link such as any one or combination of T1, ISDN, or cable line, a wireless connection through a cellular or satellite network, or a local data transport system such as Ethernet or token ring over a local area network.

Additionally, processor 702 can be embodied in any suitable computing device, and so include embedded computers, desktop computers, laptop computers, or other suitable computing devices. Processor 702 and corresponding logic instructions can be implemented using any suitable combination of hardware, software, and/or firmware, such as microprocessors, Field Programmable Gate Arrays (FPGAs), Application Specific Integrated Circuit (ASICs), or other suitable devices.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein can also be made while remaining within the scope of the following claims. The functionality and combinations of functionality of the individual modules can be any appropriate functionality. Additionally, limitations set forth in publications incorporated by reference herein are not intended to limit the scope of the claims. In the claims, unless otherwise indicated the article "a" is to refer to "one or more than one".

I claim:

1. An airship comprising:
   a hull configured to be inflated with a lighter-than-air gas;
   a ballonet disposed within the hull;
   an air cushion landing system (ACLS) configured to form a
   a plenum chamber when the ACLS is in contact with a landing surface; and
   a valve coupled between the plenum chamber and the ballonet, the valve configured to selectively allow air to flow between the ballonet and the plenum chamber, the valve configured to allow air to flow from the plenum chamber to the ballonet while the ACLS is in contact with the landing surface and the airship has a downward velocity.

2. The airship of claim 1, further comprising a duct disposed within the ballonet and configured to allow access to components and subsystems in the airship, wherein the duct is configured to support the ballonet when the ballonet is not inflated.

3. The airship of claim 2, further comprising at least one of the group consisting of: an electrical cable and a hydraulic cable routed within the duct.

4. The airship of claim 2, the duct further comprising a spine baton configured along the length of the duct.

5. The airship of claim 4, wherein the duct further comprises a plurality of rib batons spaced at intervals from one another to provide lateral support along the length of the duct.

6. The airship of claim 2, wherein the duct provides a path for maintenance access to subsystems in the airship.

7. The airship of claim 2, further comprising at least one of the group consisting of: lighting, a ladder, and a static safety line mounted in the duct.

8. The airship of claim 1, further comprising a compressed gas container containing the lighter-than-air gas, the compressed gas container configured to selectively release the lighter-than-air gas to inflate the hull.

9. The airship of claim 1, wherein the valve is further configured to prevent air from flowing between the plenum chamber and the ballonet after the downward velocity of the airship reaches zero so as to form a suction within the plenum chamber to stabilize and retain the airship on the ground.

10. The airship of claim 1, further comprising:
    an air vent in the hull; and
    a fan coupled between the air vent and the ballonet, the fan configured to selectively draw air into the ballonet through the air vent;
    wherein:
    the ACLS has a fully inflated height;
    the fan is configured to draw air into the ballonet after the downward velocity of the airship reaches zero so as to pressurize the plenum chamber through the valve and raise the airship until the ACLS is at the fully inflated height.

11. The airship of claim 1, further comprising:
    a ground pressurization port coupled to the ballonet;
    a pressure management system configured to be coupled to the ground pressurization port while the airship is parked on the landing surface and automatically maintain a pressure in the ballonet.

12. The airship of claim 11, wherein the pressure management system comprises:
    a fan configured to selectively provide pressurized air;
    a selectively operable valve configured to release air when open and retain air when closed; and
    a controller coupled to the fan and valve, the controller configured to operate the fan and valve so as to maintain the pressure in the ballonet between a high pressure condition and a low pressure condition.

13. The airship of claim 12, wherein the controller is further configured to provide an alert when one of the high pressure condition and the low pressure condition is detected.

14. A method of operating an airship, the method comprising the steps of:
    inflating an air cushion landing system (ACLS) that is coupled to a hull of the airship, the ACLS having a nominal height;
    determining with a processor an altitude of the airship;
    detecting with a sensor contact between the ACLS and a landing surface, thereby creating a plenum chamber between the ACLS and the landing surface; and
    opening a valve disposed between the plenum chamber and a ballonet disposed within the hull upon at least one of determining that the altitude of the airship is less than the nominal height of the ACLS and detecting contact between the ACLS and the landing surface, thereby allowing air to flow from the plenum chamber to the ballonet as the airship further descends.

15. The method of claim 14, the method comprising the step of:
    closing the valve to prevent air from flowing from the ballonet to the plenum chamber after determining that the altitude of the airship has stopped decreasing, thereby forming a suction within the plenum chamber to stabilize and retain the airship on the ground.

16. The method of claim 14, the method comprising the step of:
    operating a fan coupled between an air vent in the hull and the ballonet after determination by the processor that the altitude of the airship has stopped decreasing, thereby pressurizing the plenum through the valve and raising the airship until the ACLS reaches the nominal height.

17. The method of claim 14, the method comprising the steps of:
    coupling a pressure management system to the ballonet;

determining with the pressure management system a pressure in the ballonet; and automatically providing with the pressure management system air to and releasing air from the ballonet so as to maintain the pressure in the ballonet between a high pressure condition and a low pressure condition while the airship is parked on the landing surface.

18. The method of claim 17, the method comprising the step of:

automatically providing an alert by the pressure management system when one of a high pressure condition and a low pressure condition is detected.

19. A system for controlling the operating mode of an airship, comprising:

a sensor system configured to determine the altitude of the airship; and a computer processor configured to execute logic instructions to:

determine the altitude of the airship based on information from the sensor system;

determine an operating mode of the airship;

determine whether to increase, decrease or maintain the altitude and airspeed of the airship based on the operating mode;

generate signals to open or close a valve and operate a fan to control gas pressure within a hull and a ballonet enclosed in the hull of the airship based on the desired airspeed, altitude, and operating mode.

20. The system of claim 19, further comprising:

when the operating mode is takeoff, climb, or cruise, the processor is further configured to:

generate signals to adjust hull and ballonet gas pressures to be nominal and a ballonet fan speed to be zero.

21. The system of claim 19, further comprising:

the processor further configured to:

detect initial ground contact mode when the altitude of the bottom of the hull approximately equals the nominal height of an inflatable landing system coupled to the hull;

maintain the hull and ballonet pressures at a nominal value;

maintain plenum chamber pressure at a nominal value, a plenum chamber being formed by an outer portion of the airship, a landing surface, and the inflatable landing system when the inflatable landing system is in contact with a landing surface; and generate a signal to maintain a ballonet fan flow rate at zero.

22. The system of claim 19, further comprising:

the processor is further configured to:

detect ground settling mode when the altitude of the bottom of the hull is less than the nominal height of an inflatable landing system coupled to the hull;

maintain the hull pressure at a nominal value;

maintain a plenum chamber pressure at a nominal value, the plenum chamber being foamed by the bottom of the airship, a landing surface, and an inflatable landing system when the inflatable landing system is in contact with the landing surface;

generate a signal to maintain a ballonet fan flow rate at zero;

generate a signal to open a valve allowing plenum chamber air to flow into the ballonet; and determine that the airship has come to a stop when the altitude of the bottom of the hull is less than the height of the inflatable landing system.

23. The system of claim 9, further comprising:

the processor is further configured to:

detect stop mode when the altitude of the bottom of the hull is less than the nominal height of an inflatable landing system coupled to the hull;

allow the hull and ballonet pressures to be much greater than nominal hull and ballonet pressures; and generate a signal controlling the fan to produce a flow to pressurize a plenum chamber, the plenum chamber being formed by the bottom of the airship, a landing surface, and the inflatable landing system when the inflatable landing system is in contact with the landing surface.

24. The system of claim 19, further comprising:

the processor is further configured to:

detect initial hover mode when the altitude of the bottom of the hull is approximately equal to the nominal height of an inflatable landing system coupled to the hull;

maintain the hull and ballonet gas pressures at values greater than nominal hull and ballonet gas pressures;

maintain a plenum chamber pressure greater than nominal plenum chamber pressure, the plenum chamber being formed by the bottom of the airship, a landing surface, and the inflatable landing system when the inflatable landing system is in contact with the landing surface; and generate a signal to close a valve to prevent air from flowing from the plenum into the ballonet.

25. The system of claim 19, further comprising:

the processor is further configured to:

detect hover mode when the altitude of the bottom of the hull is approximately equal to the nominal height of an inflatable landing system coupled to the hull;

maintain the hull gas pressure approximately equal to nominal hull gas pressure;

maintain a plenum chamber pressure equal to nominal plenum chamber pressure, the plenum chamber being formed by the bottom of the airship, a landing surface, and the inflatable landing system when the inflatable landing system is in contact with the landing surface; and generate a signal to operate a fan to maintain pressure in the plenum chamber and the ballonet.

* * * * *

UNITED STATES PATENT AND TRADEMARK OFFICE
CERTIFICATE OF CORRECTION

| | | |
|---|---|---|
| PATENT NO. | : 8,167,240 B2 | Page 1 of 1 |
| APPLICATION NO. | : 12/404241 | |
| DATED | : May 1, 2012 | |
| INVENTOR(S) | : Douglas H. Greiner | |

It is certified that error appears in the above-identified patent and that said Letters Patent is hereby corrected as shown below:

IN THE CLAIMS:

Column 9, Claim 22, Line 55:   Replace "being foamed", with -- being formed --.

Signed and Sealed this
Eleventh Day of September, 2012

David J. Kappos
*Director of the United States Patent and Trademark Office*